United States Patent
Daoud

[19]

[11] Patent Number: 5,993,264
[45] Date of Patent: Nov. 30, 1999

[54] BASE FOR A MODULAR CUSTOMER BRIDGE, AND BRIDGE ASSEMBLY INCLUDING THE BASE

[75] Inventor: Bassel H. Daoud, Parsippany, N.J.

[73] Assignee: Lucent Technologies, Inc., Murray Hill, N.J.

[21] Appl. No.: 09/107,232

[22] Filed: Jun. 30, 1998

[51] Int. Cl.[6] .................................................. H01R 23/02
[52] U.S. Cl. ......................... 439/676; 439/557; 439/954
[58] Field of Search ................................. 439/676, 409, 439/410, 417, 412, 413; 379/399, 438, 332, 557, 954

[56] References Cited

U.S. PATENT DOCUMENTS

| | | | |
|---|---|---|---|
| 4,396,809 | 8/1983 | Brunssen | 179/175 |
| 4,874,329 | 10/1989 | Yu | 439/409 |
| 4,913,659 | 4/1990 | Doyle | 439/395 |
| 5,004,433 | 4/1991 | Daoud | 439/502 |
| 5,222,908 | 6/1993 | Baker, III et al. | 439/557 |
| 5,240,432 | 8/1993 | Daoud | 439/417 |
| 5,562,478 | 10/1996 | Yamamoto | 439/409 |
| 5,681,182 | 10/1997 | Reichle | 439/417 |
| 5,721,396 | 2/1998 | Daoud | 174/59 |
| 5,740,685 | 4/1998 | Daoud | 70/164 |

OTHER PUBLICATIONS

Egerton, Advertisement entitled "Mini–Rocker Cross Connect".

*Primary Examiner*—Neil Abrams
*Assistant Examiner*—Javaid Nasri
*Attorney, Agent, or Firm*—Duane Morris & Heckscher LLP; Steven E. Koffs

[57] ABSTRACT

A customer bridge has a base which can accommodate modular network interface components, and allows the customer output connector to be installed in a selected one of two different positions. The base has a jack which is connectable to an external telephone network. The jack is adapted to receive a plug. The base has a connector mount for mounting a connector. The connector is connectable to the plug by a cable. The connector mount is configured so that the connector is mountable in either a first position or a second position. The second position is upside-down relative to the first position. The base is part of a telephone interface. The telephone interface includes a connector for attaching lead wires. The connector is connected to one end of a cable. The base has first and second jacks positioned in the base so that an electrical connection is formed between a first plug and a second plug when the first plug is inserted in the first jack and the second plug is inserted in the second jack. The second plug is connectable to an external telephone network via the first plug. The second plug is connected to an end of the cable opposite the connector.

26 Claims, 4 Drawing Sheets

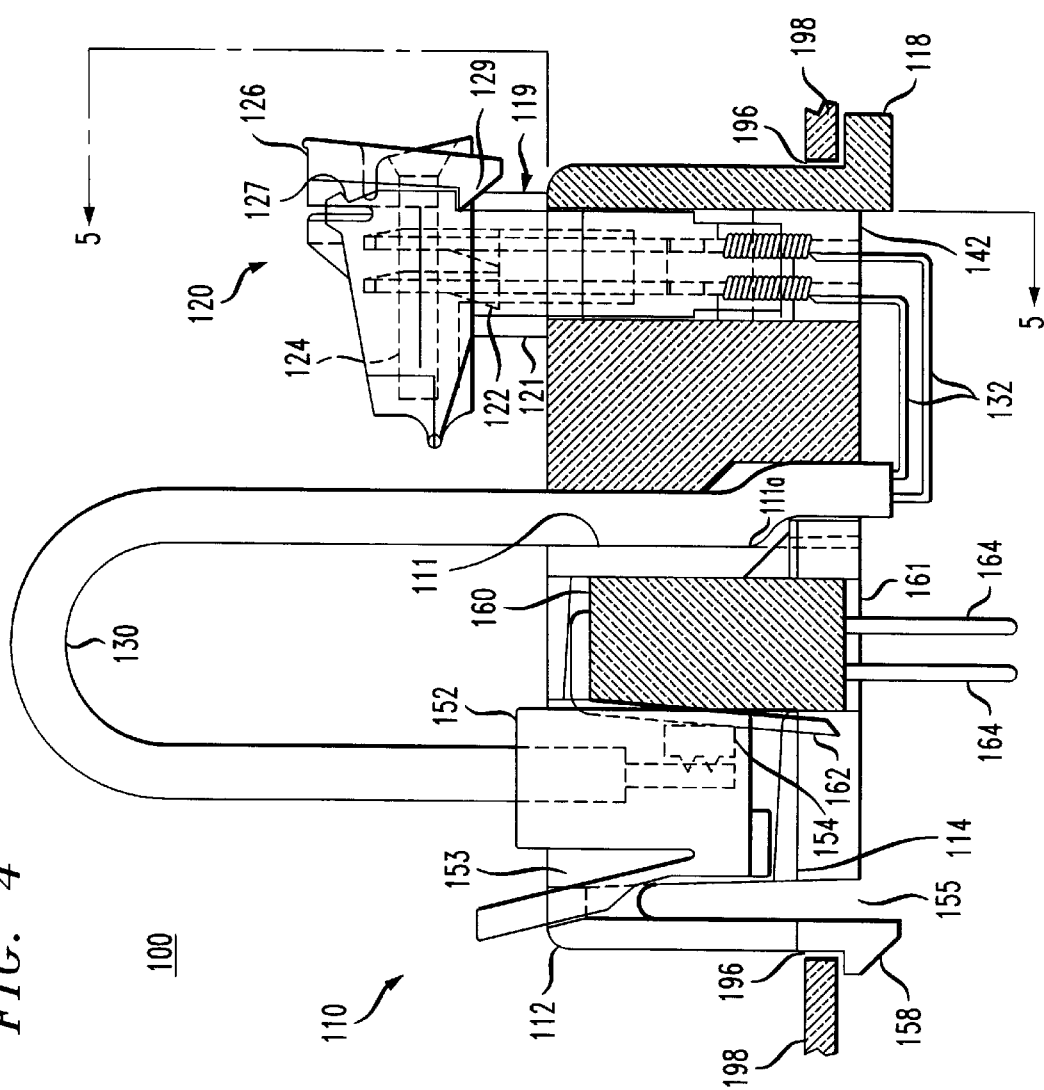

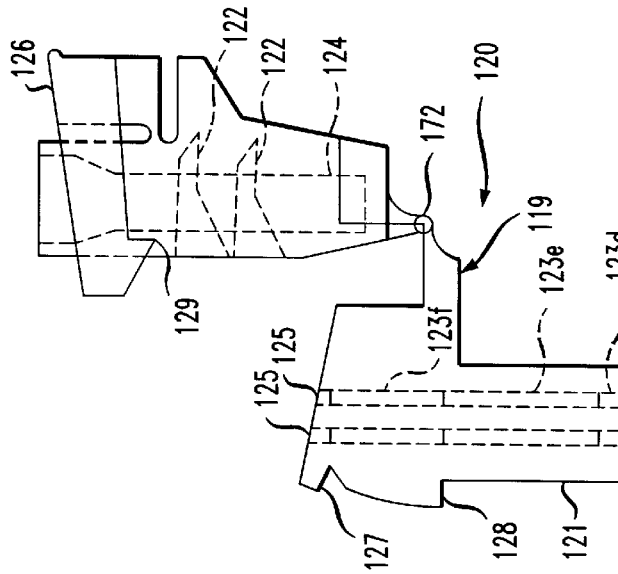
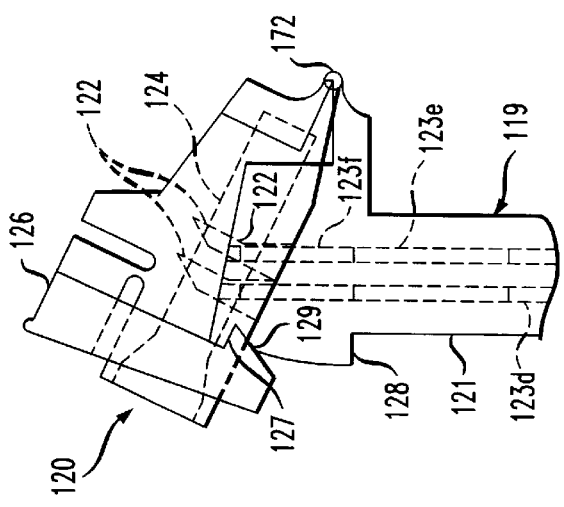
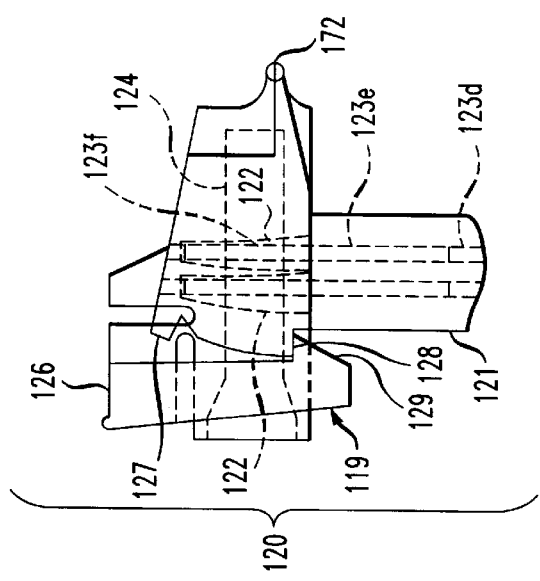

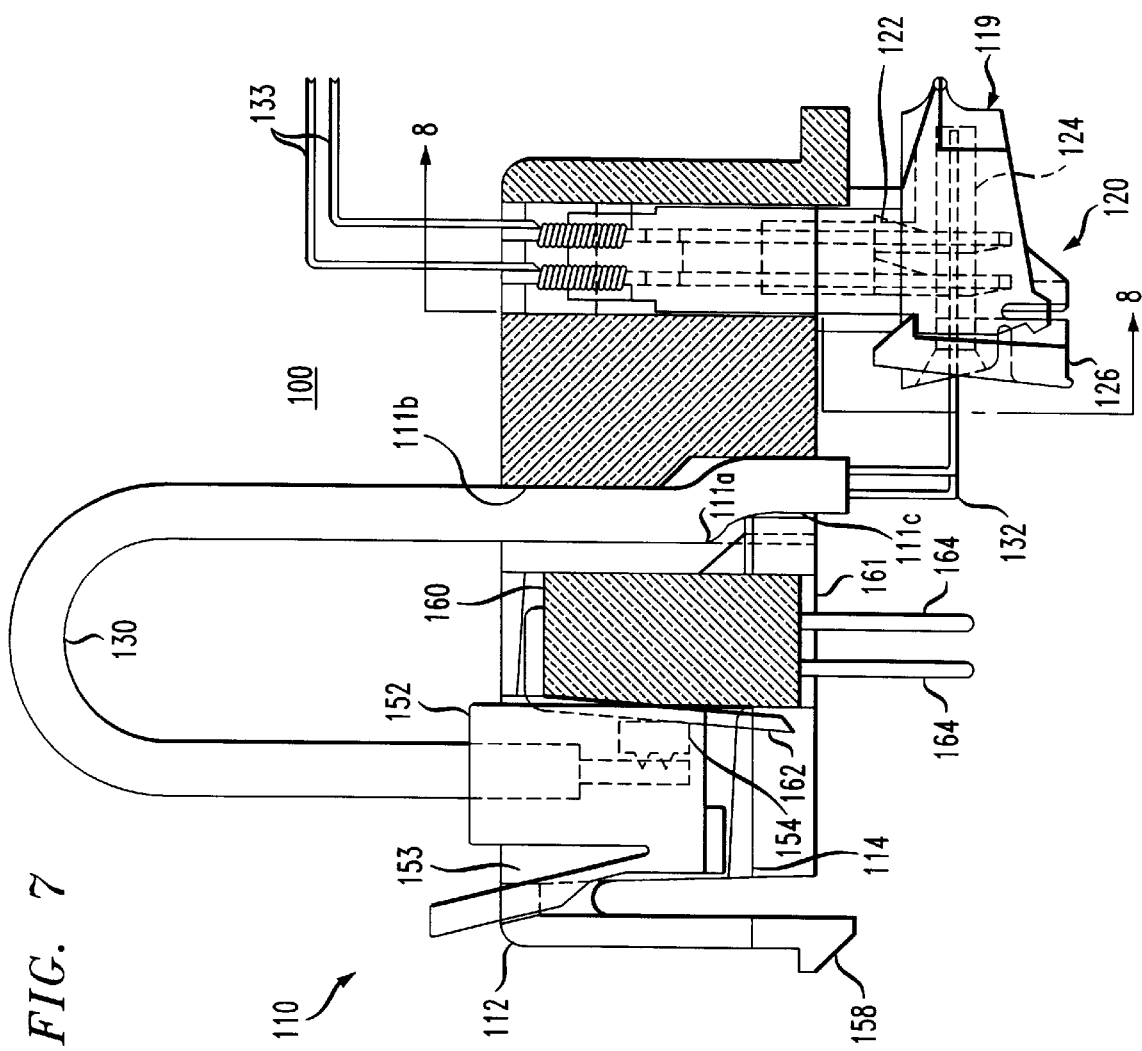

BASE FOR A MODULAR CUSTOMER BRIDGE, AND BRIDGE ASSEMBLY INCLUDING THE BASE

FIELD OF THE INVENTION

The present invention relates to network interfaces for telecommunications equipment.

DESCRIPTION OF THE RELATED ART

Most modern multi-occupant buildings have a network interface unit, which includes a plurality of customer bridges. Each customer bridge provides an interface between the external telephone network lines and the internal lines of an individual customer. An example of a bridge assembly is described in U.S. Pat. No. 5,222,908 to Baker, III et al., which is incorporated by reference herein in its entirety.

The bridge typically includes a standard RJ11 jack which provides a test point for testing continuity at the entrance to the customer premises. A standard telephone may be plugged into the RJ11 jack for test purposes; if a normal dial tone is provided, then there is continuity in the circuits outside of the customer's premises. In normal operation, however, the jack is attached to an output wire connector through an RJ11 plug/cord assembly such as the assemblies described in U.S. Pat. Nos. 5,004,433 and 5,240,432 to Daoud, both of which are also incorporated by reference herein in their entireties. The customer's telephones, PBX equipment, etc. all are in turn connected through the output wire connector.

As bridge hardware has become simpler to operate, it has become easier for unauthorized persons to tamper with customer bridge wiring. A customer bridge system is desired which can reduce tampering.

SUMMARY OF THE INVENTION

The present invention is a customer bridge base which can accommodate modular network interface components, and allows the customer output connector to be installed in a selected one of two different positions.

The invention is a base for a telephone interface. The base has a jack which is connectable to an external telephone network. The jack is adapted to receive a plug. The base has a connector mount for mounting a connector. The connector is connectable to the plug by a cable. The connector mount is configured so that the connector is mountable in either a first position or a second position. The second position is upside-down relative to the first position.

According to another aspect of the invention, the base is part of a telephone interface. The telephone interface includes a connector for attaching lead wires. The connector is connected to one end of a cable. The base has a connector mount for mounting the connector. The connector mount is configured so that the connector is mountable in either a first position or a second position. The second position is upside-down relative to the first position. The base has first and second jacks positioned in the base so that an electrical connection is formed between a first plug and a second plug when the first plug is inserted in the first jack and the second plug is inserted in the second jack. The second plug is connectable to an external telephone network via the first plug. The second plug is connected to an end of the cable opposite the connector.

According to another aspect of the invention, a method is provided for installing a connector. A connector having a first type of connection at its first end, and a second type of connection at its second end is provided. A base having a connector mount for mounting the connector is installed. The connector mount is configured so that the connector is mountable in either a first position, in which the first end of the connector is on a top side of the base, or a second position, in which the second end of the connector is on the top side of the base. Either the first position or the second position is selected. The connector is then mounted in the selected position in the connector mount.

These and other aspects of the invention are described with reference to the drawings and the exemplary embodiments.

BRIEF DESCRIPTION OF THE DRAWINGS

FIG. 4 is a cross-sectional view showing the base of FIG. 2, with a customer output connector installed in an upright position.

FIG. 5 is a partial cross-sectional view taken along section line 5—5 of FIG. 4.

FIGS. 6A–6C are rear elevation views showing the connector of FIG. 4, with the connector cap in respectively different positions.

FIG. 7 is a cross-sectional view showing the base of FIG. 2, with a customer output connector installed in an upside-down position.

FIG. 8 is a partial cross-sectional view taken along section line 8—8 of FIG. 7.

DETAILED DESCRIPTION

The present invention is a base 112 for a customer bridge, which can accommodate modular network interface components (160, 152, 130 and 120), and is usable with a variety of customer output connectors. The base 112 also allows the customer output connector 120 to be installed in a selected one of two different positions. Another aspect of the invention is a customer bridge assembly 100 which includes the modular base 112. Another aspect of the invention is a method for installing a modular customer output connector 120 to the base. These and other aspects of the invention are described below with reference to an exemplary embodiment of the invention.

Figure 3:
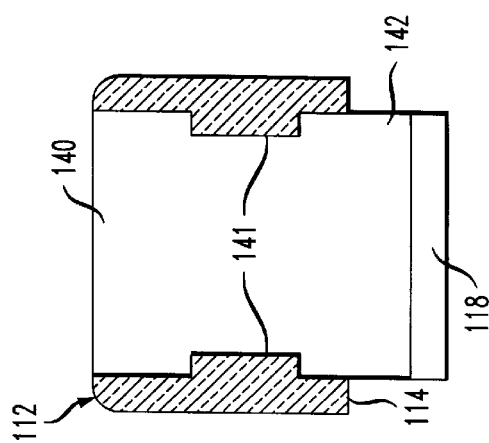
FIG. 3 is a cross-sectional view taken along section line 3—3 of FIG. 1.
Figure 1:
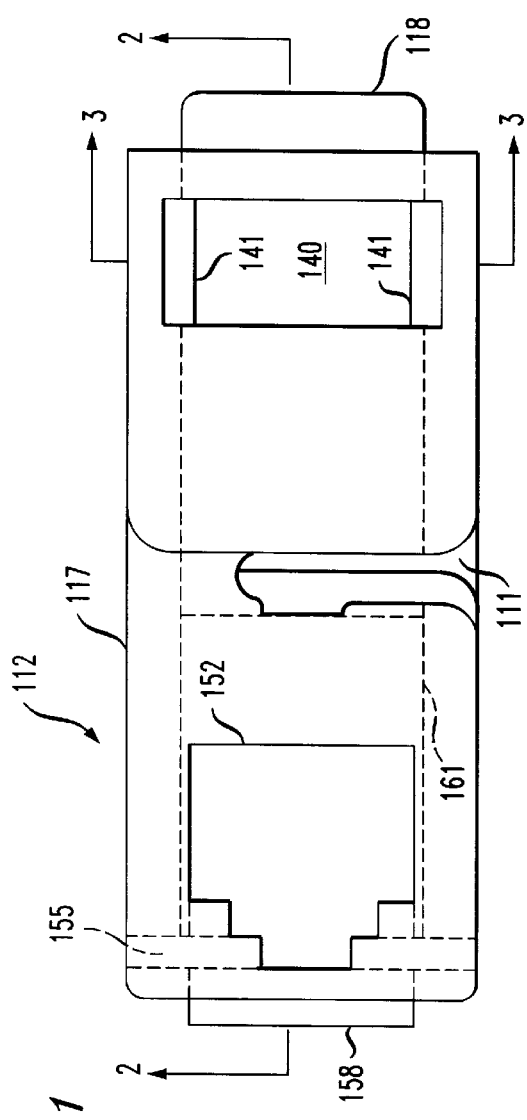
FIG. 1 is a plan view of an exemplary network interface device base according to the invention.
Figure 2:
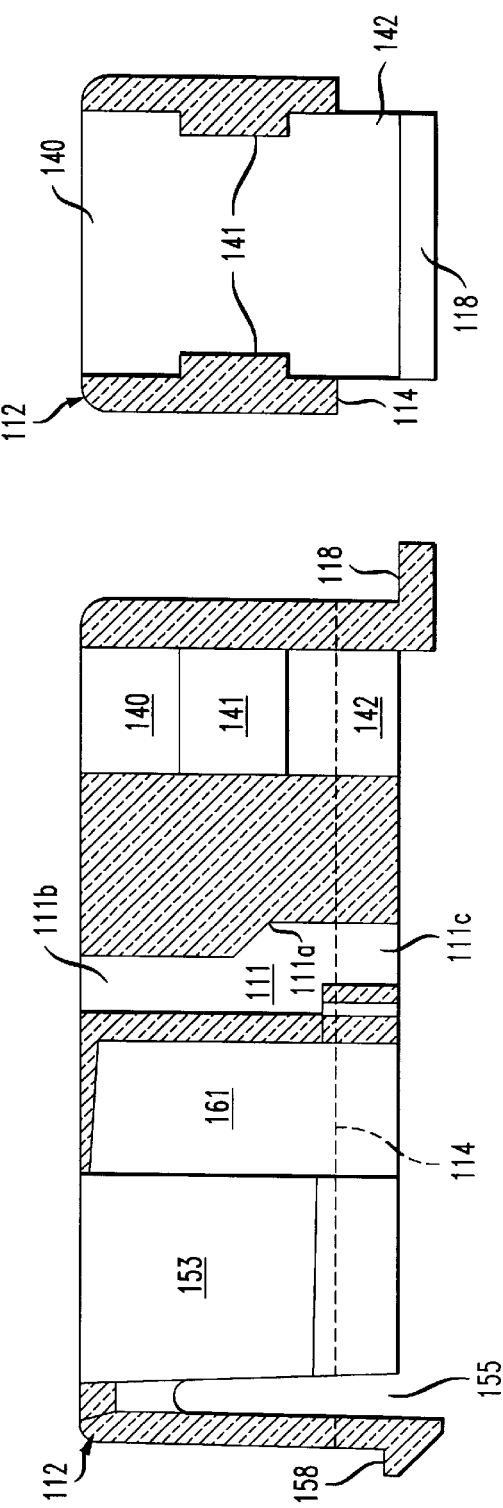
FIG. 2 is a cross-sectional view taken along section line 2—2 of FIG. 1.

FIGS. 1–3 show an exemplary base 112 according to the invention. The exemplary base 112 has a pair of jacks 153, 161, a stress relief opening 111, and a connector mount 140–142. The first jack 161 connects the bridge 100 to an external telephone network. The jack 161 is capable of receiving a plug 160 for forming an electrical connection to the network. For example, the network lines 164 coming from a central office may terminate in a type-645 plug 160.

The second jack 153 is preferably a standard jack for a telephone device, which may be an RJ11 jack. In the exemplary embodiment, there is no wall separating type-645 jack 161 from RJ11 jack 153. When an RJ11 plug 152 is inserted into jack 153, and a type-645 plug 160 is inserted into type-645 jack 161, the terminals 162 of the type-645 jack 160 engage the conductor 154 of the RJ11 plug 152, thus establishing an electrical connection between the external telephone network and RJ11 plug 152. The combined footprint of the 645-type plug 160 and the RJ11 plug 152 is about 1.25 centimeters (0.5 inches).

One of ordinary skill recognizes that an intermediate portion of conductive material (not shown) could be placed between the 645-type plug 160 and the RJ11 plug 152 without substantially changing the function or operation of the assembly. However, this would add weight to the assembly, and increase its footprint.

The jacks 153 and 161 are separated from the customer output connector mount 140–142 by a recess 111 in housing 112. Recess 111 has a portion 111*b* extending from the top of base 112 and a portion 111*c* extending from the bottom of base 112. The top portion 111*b* and bottom portion 111*c* of recess 111 are offset from one and other, with an offset portion 111*a*. As shown in FIG. 4, the offset 111*a* has two functions: offset 111*a* grips cable 130 and provides a stress relief to the base 112. When cable 130 is inserted into recess 111, the offset 111*a* grips the cable 130 and prevents slippage of the cable. The recess 111 extends from one face only, namely the front face of the assembly 100 as shown. The back face 117 of housing 112 extends continuously along the length of housing 112. The use of an offset configuration 111*a* for stress relief is described in greater detail in U.S. Pat. No. 5,004,433 to Daoud, which is incorporated by reference herein in its entirety.

The base 112 has a customer output connector mount 140–142, which may be at the end of base 112 opposite the jacks 153 and 161. The connector mount 140–142 accepts a variety of customer output connector types. The exemplary cable mount 140–142 is configured so that the connector 120 is mountable in either a first position (FIGS. 4 and 5) or a second position (FIGS. 7 and 8). The second position is upside-down relative to the first position.

The exemplary connector mount 140–142 has a single substantially rectangular passage extending from a top of the base to a bottom of the base. The passage has a mounting portion 141 in at least one wall of the passage 140, 142. The mounting portion 141 has a plane of symmetry between the top of the base and the bottom of the base, so that it can accept the connector 120 in either an upright or upside-down position. It is not necessary that the mounting portion 141 be centered between the top and bottom of the base 112.

Although the exemplary mounting portion 141 extends inwardly from the one wall of the passage 140, it is not necessary that the mounting portion extend inwardly. A concave mounting portion may also be used, with a correspondingly shaped customer output connector.

The base 112 provides a single platform which may be used for a variety of customer bridge configurations. This enhances inventory management. A user can stock a large number of units of base 112, and smaller quantities of each type of customer output connector that is used. The customer output connectors can be stocked in proportion to the demand for each type of connector.

The base 112 may be mounted in a conventional network interface panel 198. A typical sheet metal panel 198 has a plurality of standard sized rectangular openings 196. The two ends 118 and 158 of the base 112 form a latch mechanism, by which the bridge assembly is mounted in an opening 196 of panel 198. A bearing surface 114 engages the sheet metal surface of the panel 198 around the opening and prevents the assembly 100 from falling out the back of the panel.

FIGS. 4 and 5 show an exemplary customer bridge assembly 100 which includes the base 112 of FIGS. 1–3. An interface to an external telephone network is provided by a plug 160 inserted in jack 161.

In a residential building, the plug 160 is typically located near the point where the wires 164 enter the building. In a multi-tenant building, the plug 160 is typically located in a network interface unit which houses a respective plug 160 for each subscriber. An RJ11 plug/cord assembly is provided, including a plug 152, cable 130, and connector 120.

RJ11 plug 152 is connected to a cable 130 having standard tip and ring wires 132. Cable 130 provides a simple means to connect the customer output connecter 120 with NID 110. During normal operation, RJ11 plug 152 is inserted into RJ11 jack 153. Plug 152 may be removed, in order to test the network connection (i.e., by inserting the plug of a standard telephone device into jack 153). Similarly, plug 152 may be removed any time that it is necessary to perform work on the customer output connector 120. This protects a human handling the wires in the customer output connector 120, in the event of an abnormal high-voltage condition, which may occur if above ground telephone wires are struck by lightening.

According to a further aspect of the invention, the NID 110 is housed on the same base 112 as the connector 120. Thus, the entire bridge assembly 100, including the base 112, RJ11 plug 152, cable 130 and connector 120 (with wire wraps 132*a* on terminals 123) may be pre-assembled and packaged for a quick installation. Further, the assembly 100 occupies a smaller footprint than known customer bridges. The base 112 may have a footprint of about 4 centimeters (1.75 inches) by 1.5 centimeters (0.5 inches).

As noted above, any preferred type of customer output connector may be used, including insulation displacement connectors, screws, or other type. The connector need only have a standard mounting which is compatible with the mounting portion 141 of the base 112. As shown in FIG. 5, exemplary connector 120 has two latches 120*a* which allow the connector 120 to be detachably connected to the base 112. It is not necessary to use a removable connector 120. In some installations, a relatively permanent mounting may be preferred.

If the RJ11 plug 152, cable 130, connector 120 and wire wraps 132*a* are pre-assembled, then the procedure for installing the bridge assembly 100 in the network interface unit panel may be as simple as: (1) snapping the assembly 100 into the opening 196 by latch 158, (2) unplugging the RJ11 jack 152 (if plugged in), (3) inserting the 645-type plug 160 into jack 161, (4) inserting customer lead wires 133 into holes 124, (5) snapping the cap 126 of connector 120 into the closed position of FIG. 2A, and (6) inserting the RJ11 plug 152 into the RJ11 jack 153.

According to a further aspect of the invention, the connector 120 may be mounted in an inverted position, as shown in FIGS. 7 and 8. In the exemplary embodiment, the connector 120 has a pair of terminals 123. Each terminal 123 has a wire-wrap connection 132*a* one bottom end 123*a,* and an insulation displacement connection 123*f* at the other end. In FIGS. 4 and 5, a pair of wires 132 extending from the cable 130 are connected via the wire-wrap connections 132*a,* and the lead wires 133 (not shown in FIG. 4) are connected via the insulation displacement connections 123*f.* In FIGS. 7 and 8, the pair of wires 132 extending from the cable 130 are connected via the insulation displacement connections 123*f,* and the lead wires 133 are connected via the wire-wrap connections 133*a.*

According to still another aspect of the invention, a method of assembling the connector 120 to the base 112 is provided. The person assembling the bridge 100 selects either the first position (shown in FIGS. 4 and 5) or the second position (shown in FIGS. 7 and 8). The step of selecting may include the steps of: (1) determining whether a quick-connect interface or a tamper-resistant interface is desired, (2) selecting the first position if the quick-connect interface is desired, and (3) selecting the second position if the tamper-resistant interface is desired. The connector 120 is then mounted in the selected position in the connector mount 141.

More generally, the method includes providing any connector having two types of connections for wires, the first type of connection being easier or quicker to use than the second. If a quicker and easier interface is desired, the connector is installed so that the first type of connection is accessible from the top of the base 112. The quicker and easier interface may be preferred if the bridge assembly 100 is housed within a physically secure space, such as a locked cabinet, or a single occupant building. If a more tamper-resistant interface is desired, the connector is installed so that the second type of connection is accessible from the top of the base 112. A more tamper resistant connection may be desired if the bridge assembly 100 is housed in a non-secured area, for example, a pay phone booth.

If the configuration of FIGS. 7 and 8 is used, the first end of a cable 130 is connected to the end of the connector 120, which is on the bottom side of the base 112. The other end of the cable 130 has the plug 152 connected to its opposite end. The RJ11 plug 152 is inserted into the RJ11 jack 153. The RJ11 jack 153 is electrically connected to an external telephone network via the type-645 plug 160, as described above. The lead wires 133 are connected to the end of the connector 120 which is on the top side of the base, for example using a wire wrap connection 133*a*.

One of ordinary skill in the art understands that a base 112 according to the present invention may also be used with a customer output connector having both the top and bottom connections of the same type. For example, a device having the IDC connections on both the top and the bottom could be used. All of the other advantages of the base 112 would still be realized, except that the degree of security of the customer output connector would not be changed by simply inverting the connector.

In the exemplary embodiment, the lead wire receiving holes of connector 120 face away from the cable 130 and plug 152. This reduces physical interference from the cable 130 and plug 152 when the installer is inserting the lead wires 133 into the holes 124. Further, if a column of bridge assemblies 100 are laid out adjacent to one another (with the opening 111 of one connector 120 facing the solid side 117 of the next connector), the lead wire receiving holes 124 of the connectors 120 all point in a direction perpendicular to the length of the column. Thus, physical interference in the wiring of adjacent bridge assemblies is avoided.

One of ordinary skill understands that the connector mount 140–142 may be aligned with the length of base 112, so that the lead wire receiving holes 124 are facing the front in FIG. 4. Such a configuration, however, may be less convenient for the person installing the lead wires 133.

Connector 120 is now described in detail. Connector 120 is generally similar to a single connector of the type used in the 10-pair mini-rocker module RBC2100 manufactured by the Egerton Company of Cheshire, England. Connector 120 has two main components: a housing 119 and a pair of terminals 123. The housing 119 has two main portions: a body 121 and a cap 126.

Body 121 has first and second openings 125 in which the respective first and second terminals 123 are seated. Body 121 may be integrally formed from the same piece of material as base 112, as shown. Alternatively, body 121 may be formed from a separate piece of material and fastened to base 112 using a conventional technique, such as a mechanical fastener (e.g., a latch, not shown) or an adhesive, which may be an epoxy.

As is well known in conventional insulation displacement connectors, each of the terminals 123 may include a bottom portion 123*a* suitable for a wire-wrap connection 132*a* to wires 132. Exemplary terminal 123 has a connecting portion 123*c*, a barb 123*b* and a shoulder 123*d*. Terminal 123 is either fastened to body 121 using an adhesive (which may be an epoxy), or pressed into body 121 by an interference fit.

A top portion 123*e* of terminal 123 has means for displacing sufficient insulation from a lead wire 133 to form an electrical connection. In the exemplary terminal 123, the insulation displacing means may be a pair of upwardly extending tangs 123*f* for receiving the customer lead wires 133, and stripping insulation from the lead wires 133. Other equivalent insulation displacing means may be used.

The exemplary cap 126 of housing 119 is pivotally attached to the body 121 of the housing. The cap 126 of the housing 119 has two slots 122 which fit over the terminals 123 when the cap is pivoted to the positions shown in FIGS. 6A and 6B. The slots 122 are aligned with the slots 125 of the body 121 of the housing 119. The slots 122 may be slightly larger at the bottom than at the top, so that the bottom of the slot 122 can clear the tangs of terminals 123*f* throughout the range of motion of cap 126.

The cap 126 includes first and second lead wire receiving holes 124. The cap 126 of the housing 119 has an open position (FIG. 6B) for insertion of respective lead wires 133 in the holes 124. The cap 126 of housing 119 also has a closed position (FIG. 6A) for connecting the upwardly projecting members 123*e* of the terminals 123 to the lead wires 133.

Cap 126 has a latch 129 which may be engaged by either one of projections 128 (FIG. 6A, closed position) or 127 (FIG. 6B, open position).

Cap 126 pivots about the pivoting joint 172. One of ordinary skill in the art recognizes that the body 121 and cap 126 of housing 119 may be formed from a single piece of material, in which case the pivoting joint 172 may be a living hinge. The material which may be, for example, an insulating plastic material, such as polypropylene or polycarbonate. In particular, if the living hinge 172 is used, it is possible to use a single piece of material such as polypropylene.

Alternatively, the cap 126 and body 121 may be formed from separate pieces of material, in which case any conventional pivot joint may be used. One of ordinary skill further recognizes that the upper and lower portions of housing 119 need not be attached by a pivoting joint. Latches may be used alone, but that would increase the chance that the cap 126 becomes lost when separated from the body 121.

FIG. 6C shows the connector 120 with the cap 126 pivoted completely off of the body 121 of connector 120, for installing the terminals 123. With the cap 126 in the position shown in FIG. 6C, terminals 123 are easily inserted into slots 125, as shown. Using a relatively small barb 123*b*, as shown, the terminals 123 may be pressed into the slots 125, without using any adhesives.

Once assembled, connector 120 is normally positioned with latch 129 engaging either projection 127 in the open position (FIG. 6B) or projection 129 in the closed position (FIG. 6A). With connector 120 in the open position (FIG. 6B), customer lead wires 133 may be inserted into lead wire receiving holes 124. By pressing down on cap 126, the user causes cap 126 to pivot about living hinge 172, forcing the customer lead wires 133 down into the tangs 123f of terminals 123. By the time cap 126 reaches the closed position shown in FIG. 6A, sufficient insulation is displaced from the customer lead wires 133 to establish an electrical connection between the customer lead wires 133 and terminals 123.

Moreover, a conductive coupling is established between the customer lead wires 133 and the telephone network conductors 164, by way of a path which includes terminals 123, wires 132, RJ11 plug 152, conductor 162, 645-type plug 160, and wires 164.

One of ordinary skill in the art recognizes that many variations of the exemplary embodiment are contemplated. For example, instead of including latches 129 on both sides of connector 120, a single latch similar to latch 129 may be positioned in between the lead wire receiving holes 124.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A base for a telephone interface,
    said base having first and second jacks positioned in said base so that an electrical connection is formed between a first plug and a second plug when the first plug is inserted in the first jack and the second plug is inserted in the second jack; and
    said base having a connector mount for mounting a connector, the connector being connectable to the second plug by a cable, the connector mount being configured so that the connector is mountable in either a first position or a second position, said second position being upside-down relative to the first position.

2. The base according to claim 1, wherein the connector mount comprises a single passage extending from a top of the base to a bottom of the base, said passage having a mounting portion in at least one wall of the passage.

3. The base according to claim 1, wherein the base has an opening, the opening having a first portion extending downward from a top of the base and a second portion extending upward from a bottom of the base, the first and second portions of the opening being offset from each other, so that the opening grips the cable when the cable is inserted into the opening.

4. The base of claim 1, wherein the second plug is connectable to an external telephone network via the first plug.

5. The base of claim 1, wherein the base is integrally formed of a single piece of material.

6. A base for a telephone interface,
    said base having a jack which is connectable to an external telephone network, said jack being adapted to receive a plug; and
    said base having a connector mount for mounting a connector, the connector being connectable to the plug by a cable, the connector mount being configured so that the connector is mountable in either a first position or a second position, said second position being upside-down relative to the first position,
    wherein the connector mount comprises a single passage extending from a top of the base to a bottom of the base, said passage having a mounting portion in at least one wall of the passage, and the mounting portion has a plane of symmetry between the top of the base and the bottom of the base.

7. The base according to claim 6, wherein the mounting portion extends inwardly from the one wall of the passage.

8. A base for a telephone interface,
    said base having a jack which is connectable to an external telephone network, said jack being adapted to receive a plug; and
    said base having a connector mount for mounting a connector, the connector being connectable to the plug by a cable, the connector mount being configured so that the connector is mountable in either a first position or a second position, said second position being upside-down relative to the first position,
    wherein the connector mount comprises a single substantially rectangular passage extending from a top of the base to a bottom of the base, said passage having a pair of projections extending inwardly from two opposing side walls of the passage.

9. A telephone interface comprising:
    a connector for attaching lead wires, the connector being connected to one end of a cable; and
    a base having a connector mount for mounting the connector, the connector mount being configured so that the connector is mountable in either a first position or a second position, said second position being upside-down relative to the first position,
    said base having first and second jacks positioned in said base so that an electrical connection is formed between a first plug and a second plug when the first plug is inserted in the first jack and the second plug is inserted in the second jack, the second plug being connectable to an external telephone network via the first plug, the second plug being connected to an end of the cable opposite the connector.

10. The telephone interface according to claim 9, wherein the connector has a pair of terminals, each terminal having a wire-wrap connection at one end thereof, and an insulation displacement connection at the other end thereof.

11. The telephone interface according to claim 10, wherein a pair of wires extending from the cable are connected via the wire-wrap connections, and the lead wires are connected via the insulation displacement connections.

12. The telephone interface according to claim 10, wherein a pair of wires extending from the cable are connected via the insulation displacement connections, and the lead wires are connected via the wire-wrap connections.

13. The telephone interface according to claim 9, wherein the connector mount comprises a passage extending from a top of the base to a bottom of the base, said passage having a mounting portion in at least one wall of the passage.

14. The telephone interface according to claim 13, wherein the mounting portion has a plane of symmetry between the top of the base and the bottom of the base.

15. The telephone interface according to claim 14, wherein the mounting portion extends inwardly from the one wall of the passage.

16. The telephone interface according to claim 9, wherein the connector mount comprises a substantially rectangular passage extending from a top of the base to a bottom of the base, said passage having a pair of projections extending inwardly from two opposing side walls of the passage.

17. The telephone interface according to claim 9, wherein the base has an opening, the opening having a first portion extending downward from a top of the base and a second portion extending upward from a bottom of the base, the first and second portions of the opening being offset from each other to grip the cable when the cable is inserted in the opening.

18. The telephone interface according to claim 9, wherein the first jack is on a bottom surface of the base, and the second jack is on a top surface of the base.

19. The telephone interface according to claim 18, wherein:

the base has a bearing surface for engaging a mounting surface; and the first plug has a plurality of printed circuit terminals for forming electrical connections between the first jack and a printed circuit board behind the mounting surface, when the base is mounted with the bearing surface engaging the mounting surface.

20. A method for installing a connector, comprising the steps of:

providing a connector having a first type of connection at a first end thereof, and a second type of connection at a second end opposite the first end;

installing a base having a connector mount for mounting the connector, the connector mount being configured so that the connector is mountable in either a first position, in which the first end of the connector is on a top side of the base, or a second position, in which the second end of the connector is on the top side of the base;

selecting either the first position or the second position;

mounting the connector in the selected position in the connector mount.

21. The method according to claim 20, wherein the second type of connection is different from the first type of connection, and the connector mount has a single passage into which the connector is inserted.

22. The method according to claim 20, wherein the first end of the connector has an insulation displacement connection, and the step of selecting includes the steps of:

determining whether a quick-connect interface or a tamper-resistant interface is desired, and selecting the first position if the quick-connect interface is desired.

23. The method according to claim 20, wherein the second end of the connector has a wire-wrap connection, and the step of selecting includes the steps of:

determining whether a quick-connect interface or a tamper-resistant interface is desired, and selecting the second position if the tamper-resistant interface is desired.

24. The method according to claim 20, wherein the first end of the connector has an insulation displacement connection, and the second end of the connector has a wire-wrap connection, and the step of selecting includes the steps of:

determining whether a quick-connect interface or a tamper-resistant interface is desired, selecting the first position if the quick-connect interface is desired, and selecting the second position if the tamper-resistant interface is desired.

25. The method according to claim 20, wherein the base has a jack, the method further comprising the steps of:

connecting a first end of a cable to the end of the connector which is on the bottom side of the base, the cable having a plug connected to a second end thereof; and inserting the plug into the jack, said jack being electrically connected to an external telephone network.

26. The method according to claim 25, further comprising the step of connecting lead wires to the end of the connector which is on the top side of the base.

* * * * *